United States Patent [19]

Cheng et al.

[11] 4,346,132
[45] Aug. 24, 1982

[54] CELLULAR AIR BAG INSULATION AND INSULATOR

[76] Inventors: Chen-Yen Cheng; Wu-Cheh Cheng, both of 9605 La Playa St., NE., Albuquerque, N. Mex. 87111

[21] Appl. No.: 254,070

[22] Filed: Apr. 14, 1981

Related U.S. Application Data

[63] Continuation-in-part of Ser. No. 21,020, Mar. 16, 1979, Pat. No. 4,262,045.

[51] Int. Cl.³ .......................... B32B 3/20; E04B 1/80
[52] U.S. Cl. ......................................... 428/76; 428/72; 428/34; 428/156; 428/166; 428/188; 156/147; 5/456; 52/2
[58] Field of Search ....................... 428/68, 69, 72, 73, 428/76, 116, 118, 156, 166, 178, 188, 181, 184, 186, 920, 34; 5/455–458; 280/729; 52/2; 156/145, 147

[56] References Cited

U.S. PATENT DOCUMENTS

| 1,984,653 | 12/1934 | Palmer et al. ................. 428/166 X |
| 2,288,170 | 6/1942 | Moeller ............................. 428/178 |
| 2,604,641 | 7/1952 | Reed ..................................... 5/455 |
| 3,619,340 | 11/1971 | Jones ................................. 428/166 |
| 3,648,306 | 3/1972 | Auerbach ......................... 5/457 X |
| 4,262,045 | 4/1981 | Cheng et al. ................. 428/72 X |

FOREIGN PATENT DOCUMENTS

| 2153026 | 5/1973 | Fed. Rep. of Germany ...... 428/166 |
| 1074677 | 10/1954 | France ................................. 5/456 |
| 47270 | 12/1974 | Japan ................................. 156/145 |

*Primary Examiner*—George F. Lesmes
*Assistant Examiner*—Alexander S. Thomas

[57] ABSTRACT

A cellular air bag insulator and its uses in insulating a house window, a house door, a house wall and a process equipment, such as an evaporator, a refrigerator and a distillation column. A cellular air bag insulator can also be used as an instant shelter and can also be incorporated into an insulated panel. A cellular air bag insulator is a light weight insulator and comprises an outer enclosed bag and an expansible and collapsible multicompartment core such as a honeycomb structure joined to the outer bag. It can easily be inflated and deflated.

2 Claims, 10 Drawing Figures

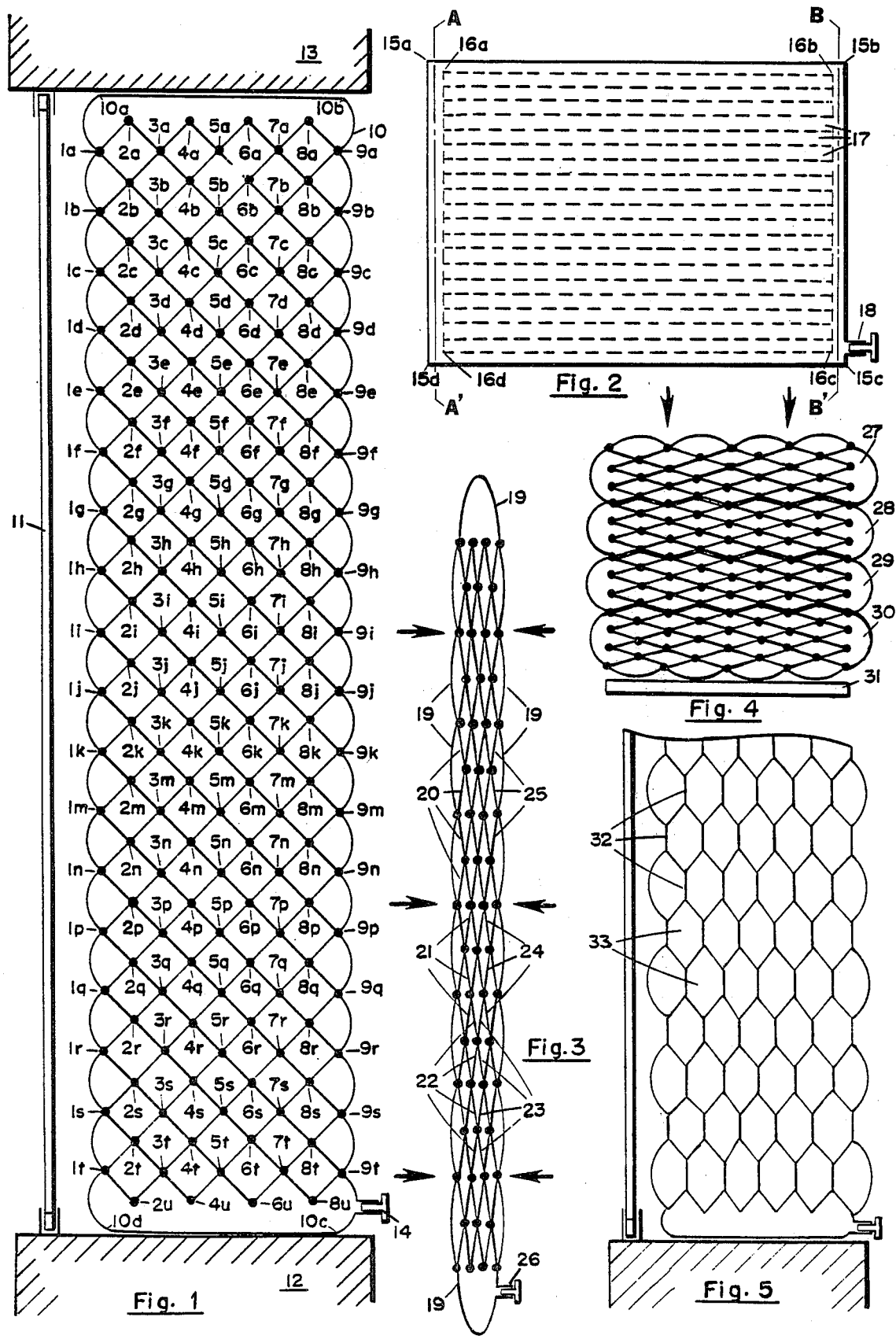

CELLULAR AIR BAG INSULATION AND INSULATOR

RELATED APPLICATIONS

This application is a continuation-in-part of Ser. No. 021,020 filed Mar. 16, 1979 entitled "Cellular Air Bag Insulation and Insulator", now U.S. Pat. No. 4,262,045.

BACKGROUND OF THE INVENTION

1. Field of Invention

In order to conserve energy, it is of utmost importance to insulate houses at windows and along outer walls. Cellular air bag insulators can be conveniently used in insulating walls and windows of houses and can be installed both on existing houses and on new houses under construction. A cellular air bag insulator is light weight and is compact in size when deflated. It can be installed on a window or along a wall without any construction modification and can be easily put up and taken down. Therefore, it is ideal for a non-permanent installation. A cellular air bag insulator made of a proper film material allows light to pass through, while imposing a high resistance to heat transfer. Therefore, it is an ideal insulator for a window area. Since a cellular air bag insulator can be put up along a wall and held in place easily and prevent air flow around it, it is an ideal insulator for a retrofit insulation of an existing wall. A cellular air bag insulator can also be used in insulating a process equipment such as a refrigerator, an evaporator, a distillation column and so on. One or more cellular air bag insulator may be used as an instant shelter for survival and as an insulated floating device. A cellular air bag insulator can also be incorporated into an insulated panel.

2. Brief Description of Prior Art

The most common method to reduce heat leakage through a house window is to use a double pane window. Because there is only one layer of confined space and it is not further compartmentized, convective heat transfer through it is still substantial. Furthermore, it is usually rather expensive to retrofit an existing window with a double pane unit. A common method to insulate a new wall is to put glass fiber insulation or rock wool insulation while it is under construction. It is difficult to retrofit existing walls by this method. One way to insulate an existing wall is to form a layer of foam plastic into the empty spaces within the wall. There have been some problems about release of toxic fume, formaldehyde, from such an installation and such a method is rather expensive.

A recent article in Popular Science Magazine, January 1979, p. 76–79, describes a high "R" shade invented by Tom Hoper and manufactured by Insulating Shade Co. of Guilford, Conn. A high "R" shade has to be used in combination with a specially designed shade frame. A high "R" shade comprises five separate layers of aluminized myler film and springy baffles running across the shade and is wound on an ordinary wooden roller. When the shade is pulled down, the baffles force the layer apart and expands the shade to a thickness of as much as 3½ inches. The five layers thus create four air spaces within the shade, each of which is compartmentized by the baffles to reduce internal convection. It is these air spaces combined with the high reflection and low emission qualities of the aluminized Mylar that give the shade its resistance to heat flow. A special shade frame is used to prevent flow of air around the shade. A shade frame comprises extruded plastic shapes, flexible plastic side seals, flexible head seals and a weight added at the bottom. The flexible seals prevent air flow at the top and sides of the shade and the weight holds the bottom edge of the shade firmly against sill of the window to prevent air flow at the bottom. A more recent article in Popular Science Magazine, March, 1981, P. 107–109, describes insulating shades that are commercially available.

It is noted that a cellular air bag insulator of the present invention does not require springy baffles and there is no need for a special frame to prevent air flow around it. Instead, because of the presence of an expandable honeycomb core in a cellular air bag insulator, a large number of air compartments in many layers are formed as the bag is inflated. Seals between the bag insulator and simple confining walls or the surface to be insulated are formed as the outer bag is inflated. The seals prevent air flow around the bag insulator.

BRIEF DESCRIPTION OF THE INVENTION

A cellular air bag insulator comprises an outer enclosed bag and an expansible and collapsible multicompartment core such as a honeycomb structure that is joined to the outer bag. The multicompartment core comprises a stack of many sheets of film material that are mutually bonded. Each inner sheet in the stack is joined on both sides to its neighboring sheets by two staggered sets of parallel joint lines or joint strips and each of the two outermost sheets in similarly joined to the neighboring sheet on one side and is joined to the outer bag on the other side. In use, a cellular air bag insulator is inflated and is so installed that the parallel joint lines or joint strips coincide with the horizontal direction. As the bag is expanded, the sheets in the stack are pulled apart to form many parallel air compartments arranged in many layers. The air compartments so formed provide a high resistance to heat transfer through the bag by reducing internal convective flow of air and by requiring heat to pass through the multilayers of the compartments. As the outer bag is inflated, it presses against the walls of a confining frame and/or the surface to be insulated to prevent air flow around the bag. In an improved cellular air bag insulator, each air compartment is closed at one end to further reduce convective flow of gas and thus improve the insulating characteristics. The Air compartments on the first, third, fifth layers etc. are closed at the first end and the air compartments on the second, fourth, sixth layers, etc. are closed at the second end. The air compartments may have square cross-sections, rectangular cross-sections or hexagonal cross-sections. Many kinds of film material may be used in making the outer bag and the honeycomb core. The films that can be used include polyethylene films, polypropylene films, polyester films, polyimide films, polyamide films, ionomer films, fluoroplastic films, cellulostic films, rubber films, PVC films, paper, various copolymer films and various coated films.

BRIEF DESCRIPTION OF THE DRAWINGS

FIG. 1 illustrates a cross-section of an inflated cellular air bag insulator installed within a window frame. It illustrates multitude of air compartments arranged in multilayers that are formed by expanding the multicompartment core, how the core is constructed from a stack of many sheets of film material properly bonded together, how the core is joined to the outer bag and how the air bag insulator seals against the confining walls of the window frame to prevent air flow around it. The air compartments shown have square cross-sections.

FIG. 2 shows a view of an inflated cellular air bag insulator in the direction perpendicular to the surface it insulates. It shows a central region containing multitude of horizontal air compartments and peripheral regions for air passages.

FIG. 3 illustrates a partially deflated air bag insulator collapsed in the horizontal direction.

FIG. 4 illustrates a partially deflated air bag insulator collapsed in the vertical direction. The figure shows that several small cellular air bag insulators may be bonded together and become a large cellular air bag insulator.

FIG. 5 illustrates a cross-section of another inflated cellular air bag insulator installed within a window frame. The air compartments shown have hexagonal cross-sections. It also shows that the multicompartment core can be made from a stock of many sheets of films material by forming parallel strips of joints between neighboring sheets of film.

DESCRIPTION OF PREFERRED EMBODIMENT OF THE INVENTION

Figure 6:
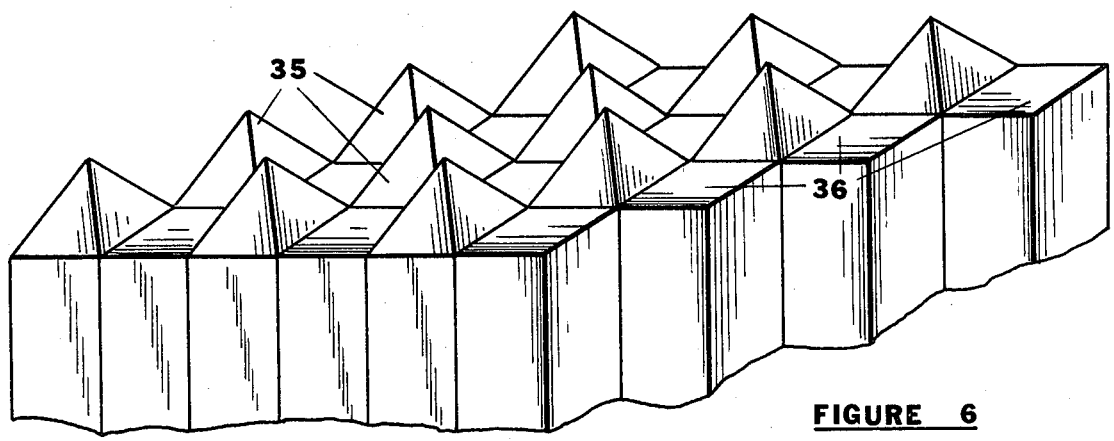
FIGS. 6, 7 and 8 illustrate the structure of an improved cellular air bag insulator. It is seen that each cellular air compartment is closed at one end and open at the end. Thus, a cellular air compartment forms a stagnant air pocket.

I. The Structure of a Cellular Air Bag Insulator

FIG. 1 illustrates a cross-section of an inflated cellular air bag insulator 10 used to insulate a window 11 that has a frame 12, 13 around it. The insulator comprises an outer bag 10a-10b-10c-10d and a multicompartment core that is joined to the outer bag. There are multitude of horizontal joint lines, multitude of walls connecting the joint lines and multitude of air compartments enclosed by the walls. The air compartments lie horizontally in multilayers and in the direction parallel to the surface to be insulated. The multicompartment core is illustrated as the region bounded by plane 1a through 1t, plane 9a through 9t, plane 2a through 8a and plane 2u through 8u, and is joined to the outer bag by joint lines 1a through 1t and by joint lines 9a through 9t. In this disclosure, words "multicompartment core", "honeycomb core" and "inner core" are used interchangeably.

It is seen that there are a large number of horizontal joint lines arranged into an array of rows and columns. The joint lines in the first column through the ninth column are respectively named as joint lines 1a through 1t, joint lines 2a through 2u, joint lines 3a through 3t, joint lines 4a through 4u, joint lines 5a through 5t, joint lines 6a through 6u, joint lines 7a through 7t, joint lines 8a through 8u and joint lines 9a through 9t. The walls joining these joint lines form a large number of horizontal compartments that are also arranged into an array of rows and columns. The compartments in the first column through the seventh column in the honeycomb core are respectively named as compartments 2a through 2t, compartments 3b through 3t, compartments 4a through 4t, compartments 5b through 5t, compartments 6a through 6t, compartments 7b through 7t and compartments 8a through 8t. Each of these compartments has a square shaped cross-section and lies horizontally in the direction parallel to the surface to be insulated.

There are air compartments formed between the outer bag and the multicompartment core around the joint lines 1a through 1t and 9a through 9t. These compartments are named compartments 1a through 1s and compartments 9a and 9s respectively. There is an upper periperal air passage 10a-10b and a lower peripheral air passage 10c-10d and an air plug 14 for inflating and deflating the bag.

FIG. 2 illustrates a view of an inflated cellular air bag insulator looking through the bag toward the surface it insulates. It shows an outer bag 15a-15b-15c-15d, a multicompartment core region 16a-16b-16c-16d, multitude of air compartments 17, the upper edge 15a--15b, the lower edge 15c-15d, the left edge 15a-15d, the right edge 15b-15c, an upper air passage 15a-15b-16b-16a, a lower air passage 15c-15d-16d-16c, a left side air passage 15a-15d-16d-16a, a right side air passage 15b-15c-16c-16b and a air plug 15c. The front surface of a cellular air bag insulator is defined as the surface of the outer bag that faces the surface to be insulated and the rear surface is the surface of the outer bag that is away from the surface to be insulated.

When a cellular air bag insulator is deflated, it occupies a small volume and can be rolled up or folded into a compact form that is convenient to store and handle. FIG. 3 illustrates a partially deflated cellular air bag insulator collapsed in the direction perpendicular to the front and rear surfaces. The insulator shown comprises an outer bag 19 and a stack of many sheets of film material 20, 21, 22, 23, 24, 25. Each inner sheet 21, 22, 23, 24 in the stack is joined on both sides to its neighboring sheets by two staggered sets of parallel joint lines; each of the outermost sheets 20, 25, is similarly joined to the outer bag on one side and to its neighboring sheet on the other side. In contrast, FIG. 4 illustrates a partially deflated cellular air bag insulator collapsed in the direction perpendicular to the upper and the lower edges. It further shows that a large insulator may be made by joining several small insulators 27, 28, 29 and 30. Such an insulator can be placed on a narrow base plate 31. An insulator illustrated by FIG. 4 can be conveniently installed on a window sill. It is seen that a large number of small sheets of film material are joined to make the multicompartment core of the insulator of FIG. 4. In contrast, a small number of large sheets of film material are joined to make the multicompartment core of the insulator of FIG. 3.

FIG. 5 illustrates a cellular air bag insulator that has a large number of wide parallel joint strips 32 and a large number of air compartments 33 that are hexagonal in cross-sections. It shows that when a stack of many sheets of film material are joined together by staggering parallel strips of joints of proper widths and the resulting stack is expanded, a honeycomb core illustrated results.

It has been described that the inner core comprises several sheets of mutually bonded flexible material and the inner core is then attached to the outer bag by two sets of linear joints. However, if it is desired to have a very light weight insulator with a relatively low heat transfer resistance value, one may use a single sheet of flexible material and attach it to the outer bag in the same way a multi-sheet core is attached to an outer bag. In this case, there are only two sets of air compartments: the first set of compartments formed by the inner sheet and the front sheet of the outer bag and the second set of compartments formed by the inner sheet and the back sheet of the outer bag.

Figure 7:
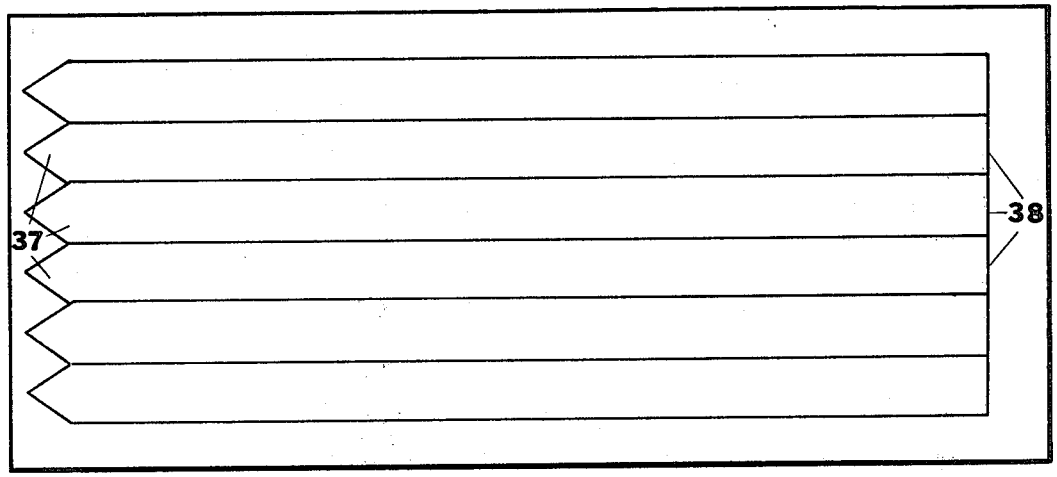
Figure 8:
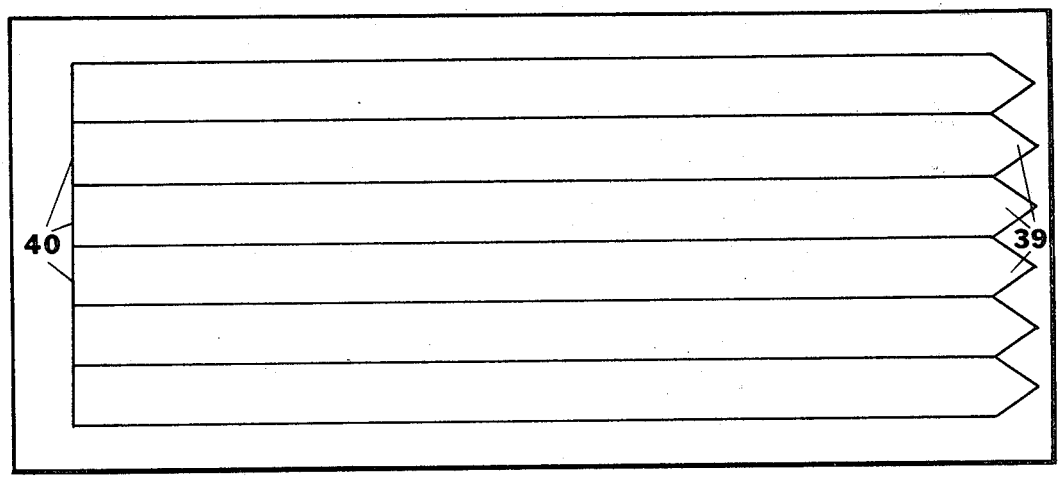

FIGS. 6, 7 and 8 illustrate the structure of an improved cellular air bag insulator. In the improved unit, each cellular air compartment is closed at one end and is open at the other end. Each compartment can be inflated and deflated through the open end and forms a stagnant air pocket. In this way, convective flow of air is further reduced and the insulating characteristics are improved. FIG. 6 illustrates a view of the air bag insulator illustrated by FIG. 2 taken at cross section AA' or BB'. It shows that air compartments 35 are closed at the first end and compartments 36 are closed at the second end. FIG. 7 shows cross sections of the air bag insulator illustrated by FIG. 1 that are taken at positions 2a–2u, 4a–4u, 6a–6u and 8a–8u. It is shown that the air compartments at these positions are closed at the first end 37 and open at the second end 38. Similarly, FIG. 8 show cross sections of the air bag insulator illustrated by FIG. 1 that are taken at positions 3a–3t, 5a–5t, 7a–7t. It is shown that the air compartments at these positions are closed at the second end 39 and open at the first end 40.

Figure 9:
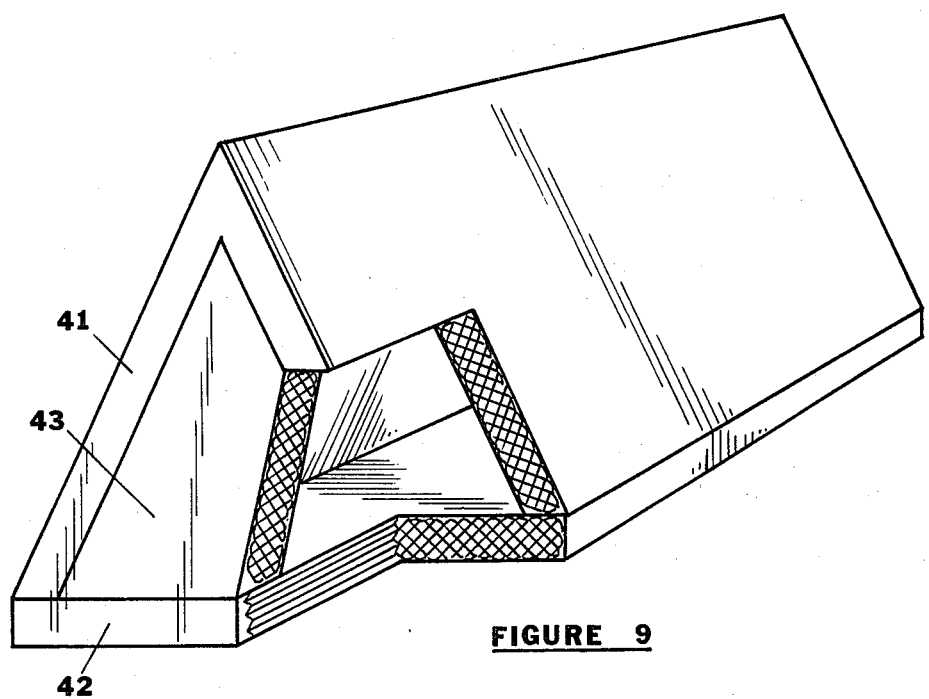
FIG. 9 illustrates an instant shelter made of one or more cellular air bag insulators.

FIG. 9 illustrates an instant shelter for camping and survival that uses one or more cellular air bag insulators 41, 42 and 43. An instant shelter is very convenient to carry along and provides a very effective shelter. The advantages of such a shelter are 1. light weight, 2. compactness, and 3. good heat insulation.

Figure 10:
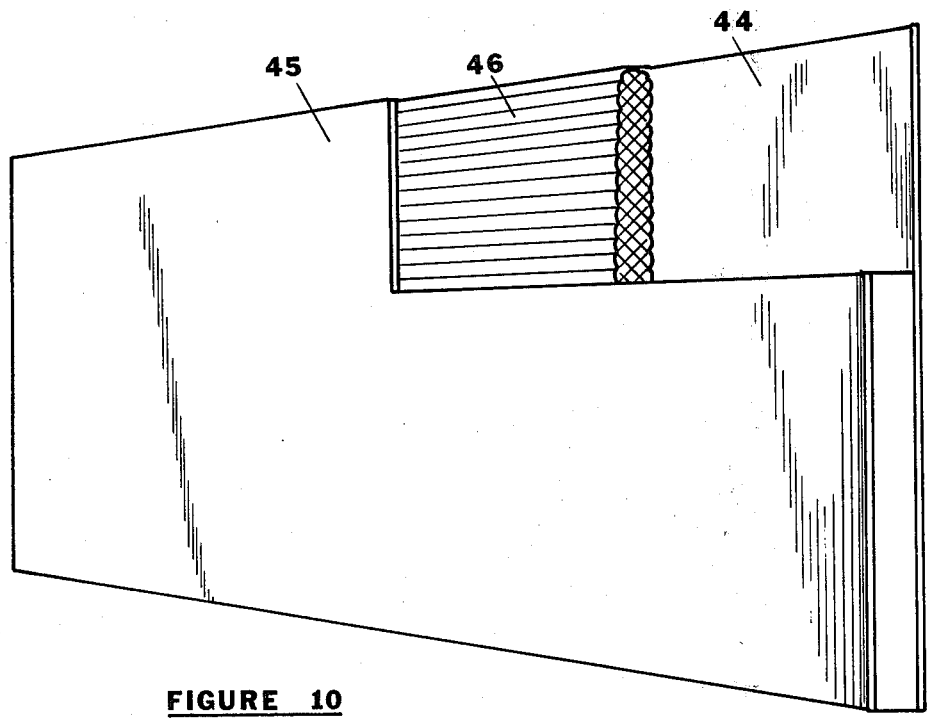
FIG. 10 illustrates how a cellular air bag insulator may be incorporated into an insulated panel.

FIG. 10 illustrates an insulated panel incorporating a cellular air bag insulator. It comprises one or two panel 44 and 45 and an air bag insulator 46 that is bonded to one or both panels. Such an insulated panel can be fabricated in a factory and shipped in the deflated state. It can then be inflated at the construction site to provide a well insulated wall.

II. How to Install a Cellular Air Bag Insulator

An air bag insulator has to be properly installed to prevent air flow around it. Referring to FIG. 1, for the air bag insulator to effectively cut down the heat transfer through the window, the air behind the rear surface 9a through 9t should be prevented from reaching the window 11 and the air trapped in the space between the window and the front side 1a through 1t, of the insulator should remain trapped. In other words, flow of air between the space at the back of the rear surface of the insulator and the space in front of the front surface of the insulator should be prevented.

There are several simple ways by which the desired sealing can be accomplished. One way is to seal along the edges; another way is to seal along the edge regions of the front surface of the insulator; still another way is to seal along the edge regions of the back surface of the insulator. One may also use a combined method sealing along some edges and some edge regions of the front or rear surface of the insulator. These methods are explained as follows:

Method 1: Sealing along the edges of the air bag insulator

Referring to FIG. 1 and FIG. 2, an air bag insulator may be installed within a confining frame of proper dimensions having a lower wall and a upper wall, and a left wall and a right wall. When the air bag insulator is inflated, the left edge 15a–15d and the right edge 15b–15c of the insulator respectively press against the left wall and the right wall of the frame; the upper edge 15a–15b and the lower edge 15c–15d of the insulator respectively press against the upper wall and the lower wall of the frame. FIG. 1 illustrates how the upper edge 10a–10b and the lower edge 10c–10d of the insulator respectively press against the upper wall 13 and the lower wall 12 of the confining frame. This method will be referred to as the edge sealing method.

When an air bag insulator is used in insulating a window with a window frame, this method of insulation may be used by using the window frame as the confining frame. When an air bag insulator is used in insulating a wall of a room, this method may be used by using the ceiling, the floor and edge regions of the side walls near the wall to be insulated respectively as the upper wall, the lower wall, the right and left walls of the confining frame.

It is noted that sealing along an upper edge or a lower edge may not be as critical in some applications. For instance, let the air bag insulator illustrated in FIG. 1 be used in preventing heat leakage from the house to the outside through the window. In this case, sealing along the side edges and the bottom edge are important, but sealing along the upper edge is not as critical. The cold air trapped in the front region tends to remain in place even when the sealing along the upper edge is not as good as those of other edges. Conversely, when the air bag insulator is used to prevent heat leakage into the house through the window, sealing along the lower edge is not as critical. This is because the hot air trapped in the front region tends to remain in place even when the sealing along the bottom edge is not as good as those of other edges.

Method 2: Sealing along the edge regions of the front surface of an air bag insulator.

Referring to FIG. 2, the front face of an air bag insulator has an upper edge region 15a-15b-16b-16a, a lower edge region 15c-15d-16d-16c, a left side edge region 15a-15d-16d-16a and a right side edge region 15b-15c-16c-16b. The desired sealing to prevent air flow around the air bag insulator can be accomplished by pressing the edge regions of the front surface against the surface to be insulated. One may also press the entire front surface of the insulator against the surface to be insulated. This method will be referred to as the surface sealing method.

When this method is used, there are needs of having some supports along the edge regions of the rear surface of the air bag to prevent air bag from moving backward so that the edge regions of the front surface can effectively press against the surface to be insulated.

Similar to what described in connection with method 1, sealing along the upper edge region is not as critical in winter insulation and sealing along the lower edge region is not as critical in summer insulation when the insulator is applied inside of the house.

Sealing may also be applied along the four edge regions at the rear surface of an air bag insulator. Since this type of installation is similar to method 2 described, a detail description of it is omitted.

Method 3: Combination of Method 1 and Method 2

In some installations, it is desirable to combine method 1 and method 2 described. In this combined method, sealings are provided along one or more edges and one or more edge regions of the front surface or the rear surface. For instance, in insulating a large wall, one may use the edge sealing method to seal the upper edge and the lower edge of the air bag insulator against the ceiling and the floor and use the front surface sealing method along the right and left sides of the air bag insulator.

III. Vertical Installation of an Improved Cellular Air-Bag Insulator

Throughout the present disclosure, it has been stated that a cellular air bag insulator is to be installed in such a way that the parallel cellular compartment lie in the horizontal direction. This is important for an insulator in which the parallel compartments are open at both ends. However, an improved cellular air bag insulator illustrated by FIGS. 6, 7 and 8 can be installed along any direction. This is because each parallel cellular compartment in an improved cellular air bag insulator is closed either at the first end or at the second end to prevent circulation of gas through the compartment and a good insulation can be accomplished even when it is installed along the vertical direction. This is a major advantage of the improved cellular air bag insulator and simplifies installation in many applications.

IV. Some Improvements That Can Be Incorporated

For insulating a window area during winter days, one may make the rear surface, 9a through 9t of FIG. 1, reflective so as to cut down the amount of radiant energy leaving the house. Conversely, for insulating a window area during summer days, one may make the front surface, 1a through 1t of FIG. 1, reflective so as to cut down the amount of radiant energy entering the house.

In order to further reduce convective flow of gas within a cellular air bag insulator, one may close both ends of each air compartment when the insulator is in use. This has to be done in a proper way so as not to interfere with the inflating and deflating of the insulator. One way is permanently close one end of each compartment. One way is to hang a strip of flexible material with a weight at the lower end in a peripheral zone inside of the insulator, say in 15a-16a-16d-15d of FIG. 2, so that the strip presses against the openings of the compartments when the insulator is installed. Still another way is to simply reduce the peripheral zone at one end of the insulator so that the edge 15a-15d either comes close to or touches the openings of the compartments.

It is most convenient to use air in inflating a cellular air bag insulator. However, it is advantageous to use an inert gas such as nitrogen and carbon dioxide from the standpoint of fire protection. Throughout the present disclosure, an insulator of the present invention has been referred to as a cellular air bag insulator and a cellular compartment has been referred to as an air compartment. Since other gases may be used to fill an insulator, the word "air" is construed to mean the gas used in filling the insulator.

V. Fabrication of a Cellular Air Bag Insulator

Basic films that can be used in making cellular air bag insulators include polyethylene films, polypropylene films, polyester films, polyamide films, polyimide films, ionomer films, fluoroplastic films, cellulostic films, rubber films, PVC films, paper, and various copolymer films. In one embodiment, polyethylene films are used to form the inner core and polyethylene coated polyester films are used to form the outer bag. One may use heat sealing, ultrasonic welding, hot melt adhesives or solvent type adhesives to form the joint lines and joint strips. Film used in forming the inner core may be 0.002 inch or less in thickness; film used for the outer bag may be 0.004 inch in thickness.

What we claim are:

1. An inflatable and deflatable cellular bag insulator that comprises
    (a) an inflatable and deflatable outer enclosure that is made of a flexible and non-porous film material, is expansible mainly along a first direction and has a front surface and a rear surface upon inflation, the front surface being adapted to face the area to be insulated while in use,
    (b) a valving means for inflating and deflating the enclosure,
    (c) an inner core that comprises at least one sheet of stacked and mutually bonded flexible film material, each sheet being joined to each neighboring sheet by a set of parallel linear joints laid in the direction substantially parallel to the front surface and substantially perpendicular to the first direction said joints extending substantially the entire length of the sheets forming expansible spaces, and the two sets of linear joints on both sides of an inner sheet being in staggered positions to each other,
    (d) linear joints joining the inner core to the outer enclosure,
    (e) at least one passage for transferring gas from the valving means to the expansible spaces of the inner core, that, upon inflating with a gas, the linear joints and the film material in the inner core and the outer enclosure are pulled away from each other to form an array of layers of parallel compartments extending from a first end to a second end and filled with the inflating gas, reducing heat transfer through the inflated unit by reducing convective flow of gas within the enclosure and requiring heat to pass through the multilayers of the gas filled compartment, wherein the improvement that comprises closing a portion of the parallel compartments at the first end and closing a portion of the parallel compartments at the second end to thereby reduce convective movement of gas contained therein.

2. An inflatable and deflatable cellular bag insulator of claim 1, wherein alternate layers of parallel compartments are closed at the first end and the second end respectively.

* * * * *